United States Patent
Bent et al.

(10) Patent No.: US 9,244,869 B1
(45) Date of Patent: Jan. 26, 2016

(54) ASYNCHRONOUS CHECKPOINTING WITH MESSAGE PASSING TO BURST BUFFERS

(71) Applicant: EMC Corporation, Hopkinton, MA (US)

(72) Inventors: John M. Bent, Los Alamos, NM (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 224 days.

(21) Appl. No.: 13/931,940

(22) Filed: Jun. 30, 2013

(51) Int. Cl.
*G06F 11/00* (2006.01)
*G06F 13/16* (2006.01)
*G06F 11/14* (2006.01)
*G06F 17/30* (2006.01)

(52) U.S. Cl.
CPC ........ *G06F 13/1673* (2013.01); *G06F 11/1407* (2013.01); *G06F 17/30224* (2013.01)

(58) Field of Classification Search
CPC ... G06F 9/3863; G06F 11/14; G06F 11/2025; G06F 11/2028; G06F 11/2035; G06F 11/2038; G06F 11/2097; G06F 11/1407; G06F 13/1673; G06F 17/30224
See application file for complete search history.

(56) References Cited

U.S. PATENT DOCUMENTS

2009/0319621 A1 * 12/2009 Barsness et al. .............. 709/206
2013/0227194 A1   8/2013 Kannan et al.
2014/0351300 A1  11/2014 Uppu et al.

OTHER PUBLICATIONS

Curry, M., Klundt, R., & Ward, H. (2012). Using the Sirocco file system for high-bandwidth checkpoints. Sandia National Laboratories, Technical Report SAND2012-1087.*
Bent, John, Garth Gibson, Gary Grider, Ben McClelland, Paul Nowoczynski, James Nunez, Milo Polte, and Meghan Wingate. "PLFS: a checkpoint filesystem for parallel applications." In Proceedings of the Conference on High Performance Computing Networking, Storage and Analysis, p. 21. ACM, 2009.*
Riesen, R.; Ferreira, K.; da Silva, D.; Lemarinier, P.; Arnold, D.; Bridges, P.G., "Alleviating scalability issues of checkpointing protocols," High Performance Computing, Networking, Storage and Analysis (SC), 2012 International Conference for, vol., No., pp. 1,11, Nov. 10-16, 2012.*
Riesen et al., "Alleviating Scalability Issues of Checkpointing Protocols", In The International Conference for High Performance Computing Networking, Storage and Analysis, Salt Lake City, UT (2012).
Why asynchronous checkpointing is so difficult: http://en.wikipedia.org/wiki/Snapshot_algorithm.

* cited by examiner

*Primary Examiner* — Bryce Bonzo
*Assistant Examiner* — Anthony J Amoroso
(74) *Attorney, Agent, or Firm* — Ryan, Mason & Lewis, LLP

(57) ABSTRACT

Improved techniques are provided for asynchronous checkpointing in parallel computing environments. A burst buffer appliance is configured to communicate with a plurality of compute nodes of a parallel computing system over a network and also to store message logs for a plurality of processes executing on the compute nodes, wherein the plurality of processes employ asynchronous checkpointing. The processes executing on the compute nodes can exchange messages and/or perform other compute operations during an asynchronous checkpointing operation. The burst buffer appliance can optionally store checkpoint data that results from the asynchronous checkpointing operations. The burst buffer appliance can optionally store the messages using a partitioned data store, such as Multidimensional Data Hashing Indexing Middleware.

23 Claims, 6 Drawing Sheets

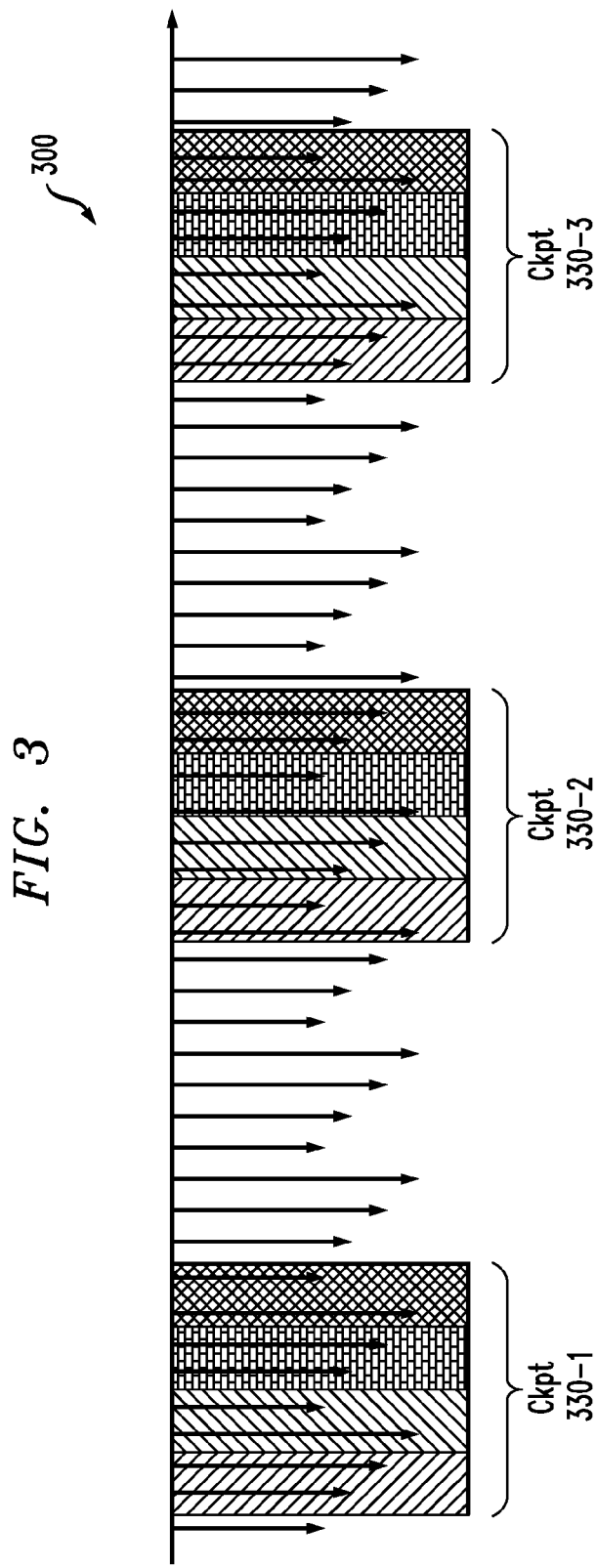

FIG. 4

```
// when recovering from a failure, each application needs
// to know when to use msg log or
// when to do the normal messaging
// also a handle on the msg log itself
static bool recovery_mode = FALSE;
static int msg_log_handle = 0;
static int my_rank; // which MPI rank am I send_msg(char *buf, int receiver, len_t len) { if (recovery_mode) {
        if (msg_log_handle == 0) {
            msg_log_handle = open_msg_log(myrank);
        }
        logged_msg = read_next_msg(msg_log_handle);
        if (logged_msg == NULL) {
            // recovery over
            recovery_mode = FALSE;
        } else {
            assert(logged_msg == make_msg(buf,receiver,len));
            // do nothing here! The other rank already received
            // this message the last time we ran
            return;
        }
    }
    // send message like normal when not in recovery mode
    msg_log->add(buf,receiver,len);
    MPI_Send(buf,receiver,len);

```
// when recovering from a failure, each application needs
// to know when to use msg log or
// when to do the normal messaging
// also a handle on the msg log itself
static bool recovery_mode = FALSE;
static int msg_log_handle = 0;
static int my_rank; // which MPI rank am I recv_msg(char *buf, int sender, len_t len) { if (recovery_mode) {
                if (msg_log_handle == 0) {
                        msg_log_handle = open_msg_log(myrank);
                }
                logged_msg = read_next_msg(msg_log_handle);
                if (logged_msg == NULL) {
                        // recovery over
                        recovery_mode = FALSE;
                } else {
                        assert(logged_msg.sender == sender);
                        copy_msg(buf,len,logged_msg);
                        return;
                }
        }
        // receive message like normal when not in recovery mode and log it
        MPI_Receive(buf,sender,len);
        msg_log->add(buf,sender,len);
}
```

FIG. 6

```
checkpoint() {

// like normal checkpointing
    save_checkpoint();

// once the checkpoint is saved, remove old msg_log
    remove_old_msg_log();

recovery_mode = FALSE; // safe to do this but not necessary
} recover() { recovery_mode = TRUE;

// like normal checkpointing/restart
    recover();
}
```

ASYNCHRONOUS CHECKPOINTING WITH MESSAGE PASSING TO BURST BUFFERS

FIELD

The field relates generally to data storage, and more particularly to checkpointing in parallel file systems.

BACKGROUND

Parallel storage systems are widely used in many computing environments. Parallel storage systems provide high degrees of concurrency in which many distributed processes within a parallel application simultaneously access a shared file namespace. Parallel computing techniques are used in many industries and applications for implementing computationally intensive models or simulations.

In many parallel computing applications, a group of distributed processes typically protect themselves against failure using synchronous checkpoints. Synchronous checkpointing is an extremely difficult workload for the storage system since each application simultaneously writes data to the storage system. Synchronous checkpoints also result in wasted resources since the storage system must be extremely powerful while remaining substantially idle between checkpoint phases.

Capturing a synchronous image of a distributed state with a large number of frequent messages exchanged is difficult. Therefore, the simplest way to checkpoint is to halt the messages by each application calling barrier operation, such as an MPI_Barrier( ) operation in a Message Passing Interface (MPI) implementation. Every process then simultaneously stores their own distributed state.

While asynchronous checkpointing provides a better solution from the perspective of storage system efficiency and also provides faster throughput for the system, asynchronous checkpointing requires the logging of all messages since the checkpoints do not correspond to a synchronous moment in the state of the distributed data structure. In other words, the complete state can be reconstructed only from both the asynchronous checkpoints and all of the logged messages. The difficulty, however, is that for typical parallel computing applications, the number of exchanged messages that must be stored can be quite large. To save the message log using disk storage would be extremely slow, and to save the message log to a faster memory storage system would be too expensive as it would require much more memory.

A need therefore exists for improved techniques for checkpointing in parallel computing environments.

SUMMARY

Illustrative embodiments of the present invention provide improved techniques for asynchronous checkpointing in parallel computing environments. In one embodiment, a burst buffer appliance is configured to communicate with a plurality of compute nodes of a parallel computing system over a network and also to store message logs for a plurality of processes executing on the compute nodes, wherein the plurality of processes employ asynchronous checkpointing.

According to various aspects of the invention, the processes executing on the compute nodes can exchange messages and perform other compute operations during an asynchronous checkpointing operation.

According to another aspect of the invention, the burst buffer appliance is further configured to store checkpoint data that results from the asynchronous checkpointing operations.

The burst buffer appliance can optionally migrate the stored checkpoint data to a parallel file system. In one variation, the burst buffer appliance stores the messages using a partitioned data store, such as Multidimensional Data Hashing Indexing Middleware. In such a variation, the messages can be stored in the partitioned data store using a key based on an identifier of one or more of a sender and a recipient of a given message.

As noted above, illustrative embodiments described herein provide significant improvements relative to conventional arrangements. In some of these embodiments, use of a burst buffer appliance for message logging in conjunction with asynchronous checkpointing provides a better balance between the relative costs of memory and disk and their relative speeds than would otherwise be possible.

BRIEF DESCRIPTION OF THE DRAWINGS

FIG. 3 illustrates asynchronous checkpointing in the parallel computing system of FIG. 1 in accordance with aspects of the present invention; and FIGS. 4 through 6 illustrate exemplary pseudo code for sending messages, receiving messages and restarting, respectively.

DETAILED DESCRIPTION

Illustrative embodiments of the present invention will be described herein with reference to exemplary parallel file systems and associated clients, servers, storage arrays and other processing devices. It is to be appreciated, however, that the invention is not restricted to use with the particular illustrative parallel file system and device configurations shown. Accordingly, the term "parallel file system" as used herein is intended to be broadly construed, so as to encompass, for example, distributed file systems and other types of file systems implemented using one or more processing devices.

As indicated previously, it is difficult in conventional parallel computing systems to store the exchanged messages when employing asynchronous checkpointing. This can lead to situations in which either performance is less than optimal or the costs of implementing the system become excessive.

Aspects of the present invention recognize that asynchronous checkpointing can significantly improve performance in a parallel computing environment, as only the failed process needs to resume from its checkpoint state and its message log. Additional aspects of the present invention address the difficulty of logging all of the messages using a burst buffer appliance. In this manner, the complete state can be reconstructed from the asynchronous checkpoints and all of the logged messages.

Figure 1:
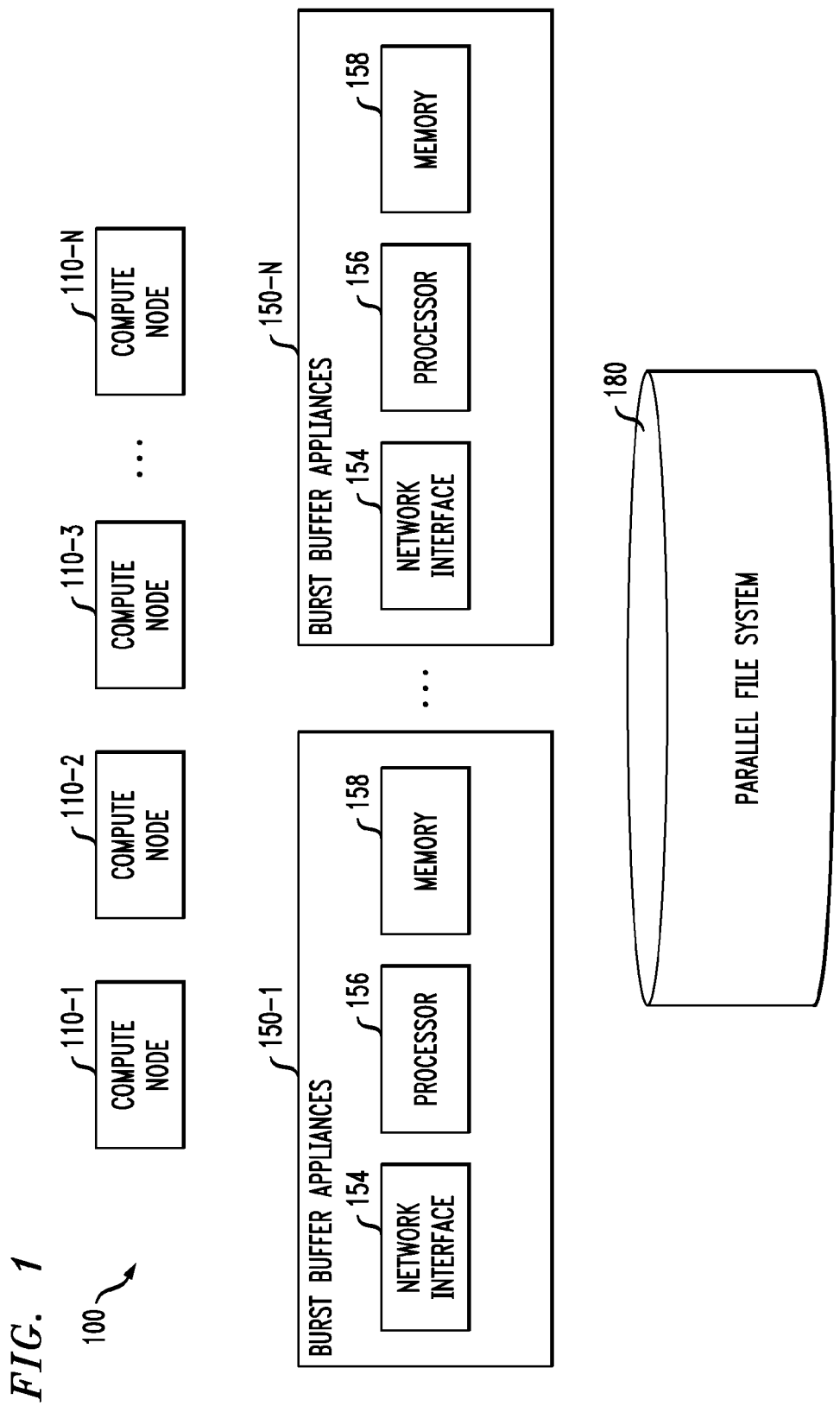
FIG. 1 is a block diagram of a parallel computing system having a burst buffer appliance for message logging in an illustrative embodiment of the invention.

In the present embodiment, these and other drawbacks of conventional arrangements are addressed by configuring a burst buffer appliance 150 in a parallel computing system to incorporate message logging functionality, as shown in FIG. 1. Generally, each application sends its message log to a burst buffer appliance 150 for storage. The burst buffer appliance 150 can optionally store the checkpoint data on a parallel file system 180 if there is sufficient bandwidth. Otherwise, the checkpoint data can be stored on the burst buffer appliance 150 and migrated to the parallel file system 180 periodically using standard burst buffer techniques.

As will be described, such arrangements advantageously allow for a flash storage device to perform message logging in a parallel computing system in a manner that avoids the need for any significant changes to clients, object storage servers, or applications running on those devices. Burst buffer appliances are well suited for message logging, because burst buffer nodes are designed and provisioned for IO operations, whereas compute nodes are designed and provisioned for compute operations. The burst buffers can be highly specialized for message logging by using high-speed random access flash memory and can additionally use a parallel log structured file system (PLFS), based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein. In a further variation described herein, a partitioned data store can be employed to store the message logs, such as Multidimensional Data Hashing Indexing Middleware (MDHIM). See, for example, http://sourceforge.net/projects/mdhim/, incorporated by reference herein.

FIG. 1 shows an exemplary parallel computing system 100 configured in accordance with an illustrative embodiment of the present invention. The exemplary parallel file system 100 comprises a plurality of compute nodes (CNs) 110-1 through 110-N, a plurality of flash-based burst buffer appliances 150-1 through 150-N, and a parallel file system 180. A group of distributed processes or applications execute on a plurality of the compute nodes 110.

The parallel file system 180 may be implemented, by way of example, in the form of a cluster file system, such as a Lustre file system, although use of Lustre is not a requirement of the present invention. Additional details regarding conventional aspects of Lustre file systems may be found in, for example, Parallel File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

Storage arrays utilized in the parallel file system 180 may comprise, for example, storage products such as VNX® and Symmetrix VMAX®, both commercially available from EMC Corporation of Hopkinton, Mass. A variety of other storage products may be utilized to implement at least a portion of the object storage targets and metadata target of the parallel file system 180.

The burst buffer appliances 150 are configured to communicate with clients and storage servers, for example, over a network (not shown). The exemplary burst buffer appliances 150 in the present embodiment are assumed to comprise a flash memory or other high-speed memory having a substantially lower access time than typical storage tiers. The burst buffer appliance 150 may optionally comprise an analytics engine and may include other components.

Although flash memory will often be used for the high-speed memory of the burst buffer appliance 150, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes 110 and a file system such as a parallel file system 180.

In the FIG. 1 embodiment, message logging is implemented in the burst buffer appliances 150 in a manner that avoids the need for any significant changes to clients, compute nodes 110, parallel file system 180 or applications running on those devices.

More particularly, in this embodiment of FIG. 1 and as discussed further below, the burst buffer appliances 150 communicate with the compute nodes 110 and parallel file system 180 to perform message logging in conjunction with asynchronous checkpointing. The burst buffer appliance 150 optionally comprises one or more controllers (not shown) to perform message logging in conjunction with asynchronous checkpointing, and numerous alternative controllers having various configurations may be used in a given burst buffer appliance 150 in other embodiments.

As shown in FIG. 1, the exemplary burst buffer appliances 150 further comprise a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the exemplary burst buffer appliances 150 is network interface circuitry 154. The network interface circuitry 154 allows the burst buffer appliance 150 to communicate over a network 106 with other devices in the parallel computing system 110. The network interface circuitry 154 may comprise, for example, one or more conventional transceivers.

The burst buffer appliances 150 may be implemented at least in part in the form of software that is stored in memory 158 and executed by processor 156.

The burst buffer appliances 150 comprising processor, memory and network interface components as described above is an example of what is more generally referred to herein as a "processing device." Each of the compute nodes 110 and storage elements within the parallel storage system 180 may similarly be implemented as a processing device comprising processor, memory and network interface components.

The network (not shown) may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

Clients may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

It should be noted with regard to the illustrative embodiment of FIG. 1 that relatively minor modifications may be made to one or more applications or other system elements or components in order to achieve additional improvements.

Figure 2:
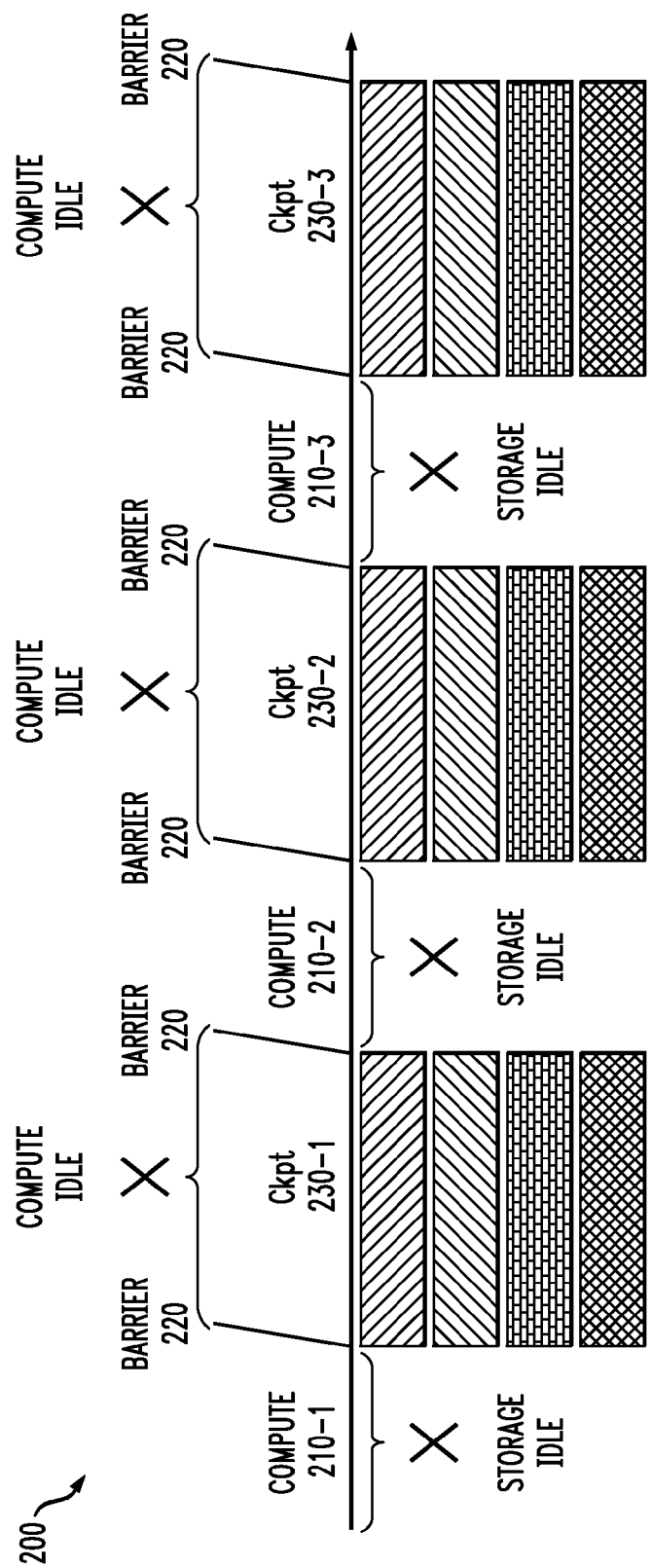
FIG. 2 illustrates a conventional technique for synchronous checkpointing in a parallel computing system.

FIG. 2 illustrates a conventional synchronous checkpointing process 200 for four exemplary distributed processes. In a conventional synchronous checkpointing process 200, a plurality of distributed processes perform computing operations during a compute phase 210, such as compute phases 210-1 through 210-3. As shown in FIG. 2, during a compute phase 210, the storage elements within the parallel file system 180 are idle. In order to capture a synchronous image of the state of each application, each application typically calls a barrier operation 220, such as an MPI_Barrier( ) operation in a Message Passing Interface (MPI) implementation, before the checkpoint operation 230 is initiated.

As shown in FIG. 2, during the checkpoint operation 230, such as checkpoint operation 230-1, each process then simultaneously stores their own distributed state as a checkpoint. In FIG. 2, a different hash pattern is employed to indicate the checkpoint for each of four exemplary processes. As shown in FIG. 2, during a checkpoint operation 230, the compute elements on the compute nodes 210 of the parallel compute system 100 are idle.

When the checkpoint operation 230 is complete, such as checkpoint operation 230-1, another barrier operation 220 is executed.

It is again noted that the bandwidth of the storage system must be provisioned for all processes to simultaneously store data during the checkpoint intervals 230 but during the compute intervals 210, the storage is essentially idle.

Asynchronous Checkpointing with Burst Buffer Logging of Messages

As indicated above, aspects of the present invention recognize that asynchronous checkpointing can significantly improve restart performance in a parallel computing environment, as only the failed process needs to resume from its checkpoint state and its message log. Additional aspects of the present invention address the difficulty of logging all of the messages using a burst buffer appliance. In this manner, the complete state can be reconstructed from the asynchronous checkpoints and all of the logged messages.

Aspects of the present invention employ one or more burst buffer appliances 150 to perform message logging in the parallel computing system 100. In this manner, applications executing on the compute nodes 110 can employ asynchronous checkpointing of their corresponding state. For example, the various applications executing on the distributed compute nodes 110 can use a token ring or another similar mechanism to determine which application can checkpoint at a given time. In addition, the applications executing on the compute nodes 110 will maintain a message log of every message they receive and every message they send on one or more burst buffer appliances 150.

As discussed further below, the message logs can be removed whenever a new checkpoint is taken. To resume a failed process, a spare process will restart from its last checkpoint, in a known manner. Every time a process needs to send a message, the process will consult the message log to see whether the process had previously sent that message and only sends the message if the message was not previously sent. Whenever the process needs to receive a message, the process can first check whether it was previously received into the message log. As indicated above, asynchronous checkpointing plus message logging requires saving the entire distributed state as well as saving all messages sent and received by each process. The required storage performance is much lower for asynchronous checkpointing.

FIG. 3 illustrates an asynchronous checkpointing process 300 incorporating aspects of the present invention for the same four exemplary processes of FIG. 2. As shown in FIG. 3, asynchronous checkpointing is performed during intervals 330 with one or more burst buffer appliances 150 performing message logging. In this manner, applications executing on the compute nodes 110 can employ asynchronous checkpointing of their corresponding state. The four exemplary processes perform compute operations and take turns checkpointing. For example, as indicated above, the various applications executing on the distributed compute nodes 110 can use a token ring or another similar mechanism to determine which application can checkpoint at a given time. In addition, the applications executing on the compute nodes 110 will maintain a message log of every message they receive and every message they send on one or more of the burst buffer appliances 150.

In the exemplary embodiment of FIG. 3, the set of messages associated with a given process are indicated using arrows having a unique length, to differentiate such messages from messages associated with another given process. In addition, a different hash pattern is employed to indicate the checkpoint for each of four exemplary processes.

Among other benefits, the asynchronous checkpointing process 300 does not require barrier operations 220 and allows processes to continue to send messages and perform other operations during a checkpoint interval 330. In this manner, the compute resources do not have to be idle, as with the conventional implementation of FIG. 2. Similarly, the storage resources do not have to be substantially idle during a compute phase.

As indicated above, the checkpoint data can be stored on one or more of the burst buffer appliances 150 or on storage within the parallel storage system 180 of FIG. 1.

It is again noted that among other benefits of the present invention, the bandwidth of the storage system can be provisioned for only one process to checkpoint at a time plus the logging of messages using one or more burst buffer appliances 150.

For a more detailed discussion of an exemplary message logging model for asynchronous checkpointing, see for example, Rolf Riesen et al., "Alleviating Scalability Issues of Checkpointing Protocols," Intl Conf. for High Performance Computing Networking, Storage and Analysis (SC 2012), http://researcher.watson.ibm.com/researcher/files/ie-rolf.riesen/riesen_12_alleviating_slides.pdf, incorporated by reference herein.

Examples of message logging operations that may be performed in the system 100 utilizing the burst buffer appliance 150 will now be described in more detail with reference to the pseudo code of FIGS. 4 through 6.

FIG. 4 illustrates exemplary pseudo code 400 for sending a message operation in a normal operating mode when every application logs send and receive messages. As indicated above, when in a recovery mode recovering from a failure, each application (typically identified by a given rank) needs to know when to use the message log or when to employ normal messaging.

FIG. 5 illustrates exemplary pseudo code 500 for receiving a message in a normal operating mode when every application logs send and receive messages. As indicated above, when in a recovery mode recovering from a failure, each application (typically identified by a given rank) needs to know when to use the message log or when to employ normal messaging.

FIG. 6 illustrates exemplary pseudo code 600 for checkpointing and restarting in a normal operating mode when every application logs send and receive messages. As shown in FIG. 6, when the checkpoint is saved, the old message log can be removed.

One variation of the present invention recognizes that saving both every sent message and every received message for every process will replicate the messages, as each message will be saved in the message logs of both the sender and the receiver(s). Thus, another aspect of the invention optionally only stores each message once. This will increase the metadata since a message cannot be removed until the sender and all receivers have freed it. For example, messages from both the sender and the receiver can be logged only into the message log of the sender. This will reduce the required storage by at least 50% at the expense of requiring more complicated metadata management and more random access into the message log. The flash memory of the burst buffer appliance 150, however, allows this random memory access to be obtained without a significant performance penalty.

In this variation, the exemplary pseudo code 400 of FIG. 4 for sending a message is unchanged, but the exemplary pseudo code 500 of FIG. 5 for a receiving a message is revised to search for the received message in the message log of the sender.

In addition, in this variation, the metadata reference count can be set to one (sender) plus the total number of recipients of the message. Thus, for a message with one recipient, the reference count is set to two. Then, upon a checkpoint by the sender and the receiver, the reference count is decremented and the message log can be then deleted when the reference count is zero.

As indicated above, further performance improvements can be obtained by storing the messages into a distributed key-value store, such as MDHIM. In such an embodiment, the key is a concatenation of Sender:Receiver identifiers.

In another variation, daemons can execute on the burst buffer nodes that store the message status in their memory. This makes garbage collection of old messages more challenging. Each message is marked with the checkpoint file name or another identifier. Then, when each process finishes each checkpoint, each process will tell the message logging system that they no longer need messages from the previous checkpoint. When both the sender and receiver have indicated that they no longer need that message, then it can be removed.

It is to be appreciated that the particular operations and associated messaging illustrated in FIGS. 4 through 6 are exemplary only, and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the parallel computing system 100. Such components can communicate with other elements of the parallel computing system 100 over any type of network or other communication media.

As indicated previously, components of a burst buffer appliance as disclosed herein can be implemented at least in part in the form of one or more software programs stored in memory and executed by a processor of a processing device.

A memory having such program code embodied therein is an example of what is more generally referred to herein as a "computer program product."

The parallel computing system 100 or portions thereof may be implemented using one or more processing platforms each comprising a plurality of processing devices. Each such processing device may comprise processor, memory and network interface components of the type illustrated for burst buffer appliances 150 in FIG. 1.

As indicated above, parallel computing system functionality such as that described in conjunction with FIGS. 1 and 3 through 6 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of parallel computing systems and associated clients, servers and other processing devices that can benefit from burst buffer implemented message logging functionality as described herein. Also, the particular configurations of system and device elements shown in FIG. 1 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus in a parallel computing system, comprising:
a burst buffer appliance configured to communicate with a plurality of compute nodes of the parallel computing system over a network;
the burst buffer appliance further configured to store message logs for a plurality of processes executing on said compute nodes, wherein said plurality of processes employ asynchronous checkpointing operations from said compute nodes into the burst buffer appliance, wherein the burst buffer appliance is further configured to store a given message in a distributed partitioned key-value data store using a key based on an identifier of one or more of a sender and one or more recipients of the given message;
the burst buffer appliance being implemented utilizing at least one processing device coupled to a memory.

2. The apparatus of claim 1 wherein the burst buffer appliance further comprises a controller to implement the message log storage functionality.

3. The apparatus of claim 2 wherein at least a portion of the controller is implemented using software, at least a portion of which is stored in said memory and executed by said at least one processing device.

4. The apparatus of claim 1 wherein the plurality of processes executing on said compute nodes exchange messages during said asynchronous checkpointing operation.

5. The apparatus of claim 1 wherein the plurality of processes executing on said compute nodes perform compute operations during said asynchronous checkpointing operation.

6. The apparatus of claim 1 wherein the burst buffer appliance is further configured to store checkpoint data that results from said asynchronous checkpointing operations.

7. The apparatus of claim 6 wherein the burst buffer appliance is further configured to migrate said stored checkpoint data to a parallel file system.

8. The apparatus of claim 1 wherein said partitioned key-value data store stores a given message only once in a message log of only one of a sender and at least one recipient of the given message by searching for said given received message in a message log of the other of said sender and said at least one recipient of the given message.

9. The apparatus of claim 1 wherein one or more messages are deleted based on a predefined garbage collection policy.

10. A processing platform comprising the apparatus of claim 1.

11. A method comprising:
configuring a burst buffer appliance in a parallel computing system to communicate with a plurality of processes executing on a plurality of compute nodes in said parallel computing system, wherein said plurality of processes employ asynchronous checkpointing operations from said compute nodes into the burst buffer appliance;
configuring said burst buffer appliance to store message logs for said plurality of processes, wherein the burst buffer appliance is further configured to store a given message in a distributed partitioned key-value data store using a key based on an identifier of one or more of a sender and one or more recipients of the given message;
the burst buffer appliance being implemented utilizing at least one processing device coupled to a memory.

12. The method of claim 11 wherein the plurality of processes executing on said compute nodes exchange messages during said asynchronous checkpointing operation.

13. The method of claim 11 wherein the plurality of processes executing on said compute nodes perform compute operations during said asynchronous checkpointing operation.

14. The method of claim 11 further comprising the step of configuring the burst buffer appliance to store checkpoint data that results from said asynchronous checkpointing operations.

15. The method of claim 14 further comprising the step of configuring the burst buffer appliance to migrate said stored checkpoint data to a parallel file system.

16. The method of claim 11 wherein said partitioned key-value data store stores a given message only once in a message log of only one of a sender and at least one recipient of the given message by searching for said given received message in a message log of the other of said sender and said at least one recipient of the given message.

17. The method of claim 11 further comprising the step of deleting one or more messages based on a predefined garbage collection policy.

18. A computer program product comprising a non-transitory machine-readable storage medium having encoded therein executable code of one or more software programs, wherein the one or more software programs when executed cause the burst buffer appliance to perform the steps of the method of claim 13.

19. A parallel file system comprising:
a burst buffer appliance; and
a plurality of compute nodes coupled to the burst buffer appliance via a network;
the burst buffer appliance configured to store message logs for a plurality of processes executing on said plurality of compute nodes, wherein said plurality of processes employ asynchronous checkpointing operations from said compute nodes into the burst buffer appliance, wherein the burst buffer appliance is further configured to store a given message in a distributed partitioned key-value data store using a key based on an identifier of one or more of a sender and one or more recipients of the given message.

20. The parallel file system of claim 19 wherein the burst buffer appliance is further configured to store checkpoint data that results from said asynchronous checkpointing operations.

21. The parallel file system of claim 19 wherein the burst buffer appliance is further configured to migrate said stored checkpoint data to said parallel file system.

22. The parallel file system of claim 19 wherein the burst buffer appliance is further configured to store said messages using a partitioned data store.

23. The parallel file system of claim 19 wherein said partitioned key-value data store stores a given message only once in a message log of only one of a sender and at least one recipient of the given message by searching for said given received message in a message log of the other of said sender and said at least one recipient of the given message.

* * * * *